UNITED STATES PATENT OFFICE.

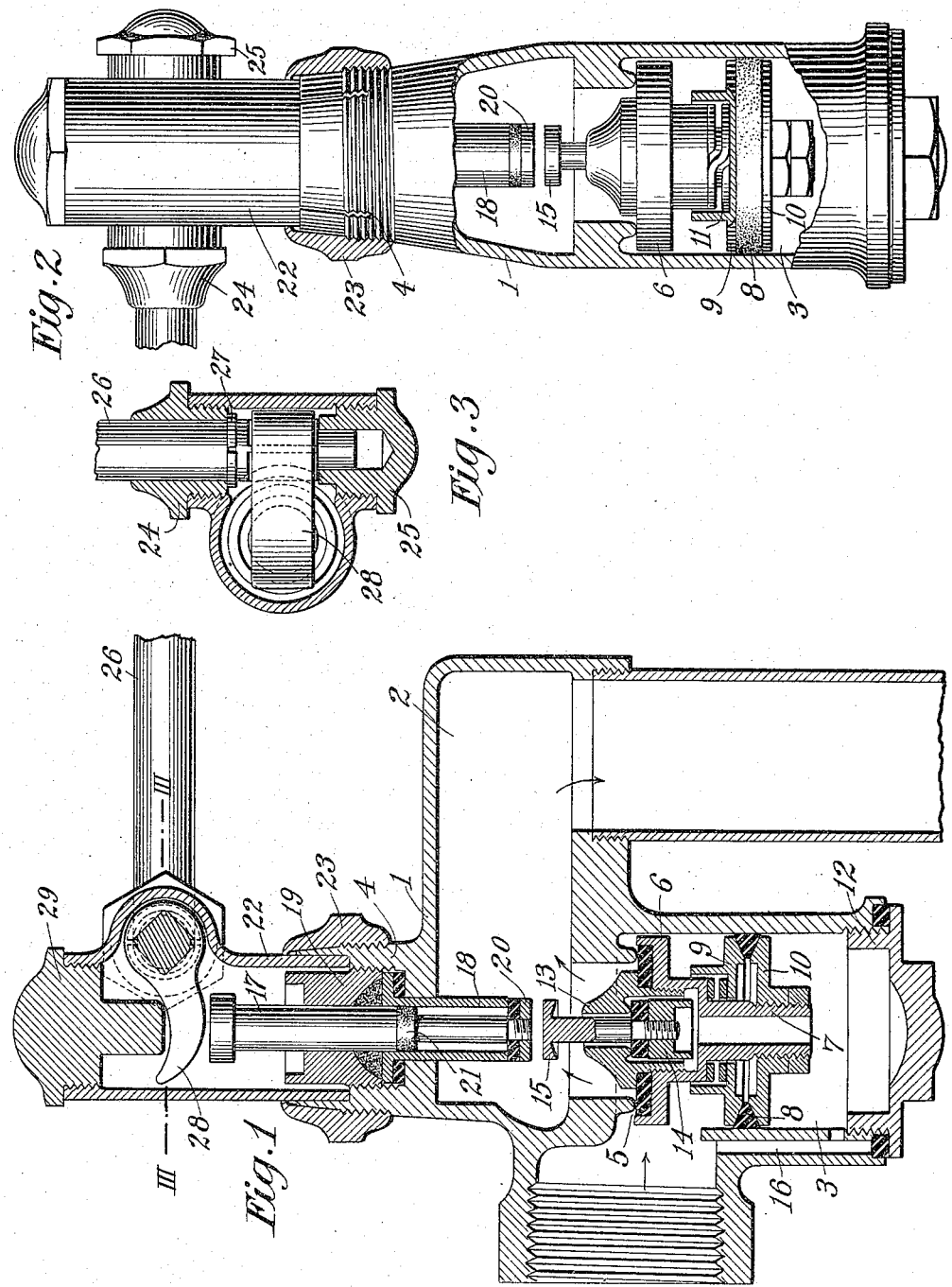

EDWARD G. HEDGES, OF NEWARK, NEW JERSEY.

SELF-CLOSING VALVE.

1,176,753.  Specification of Letters Patent.   Patented Mar. 28, 1916.

Application filed December 26, 1911. Serial No. 667,701.

*To all whom it may concern:*

Be it known that I, EDWARD G. HEDGES, a citizen of the United States, and a resident of the city of Newark, county of Essex, and State of New Jersey, have invented certain new and useful Improvements in Self-Closing Valves, of which the following is a specification.

My invention relates to self closing valves, and more particularly to that type that are manually operated to open instantaneously, and to remain open, due to their peculiar construction, for a predetermined time, and then to be self closing. Such valves, as is obvious, require, generally speaking, hand operated mechanism to accomplish the opening of the valve, and other mechanism for maintaining it in open position for the desired period, and for returning it to closed position at the expiration of such time.

This invention comprises the mechanism for returning the valve to its seat.

The construction enabling the device to remain open for a predetermined period and then to close of itself comprises a water filled chamber, an element in operable connection with the water controlling check valve to be operated simultaneously with the opening of the valve to reduce the volume of the chamber; automatically closing means adapted to be opened when the reduction in volume is taking place, to afford an exit for the displaced water in the chamber; and a comparatively minute passageway connecting the chamber with the water supply conduit to afford a slow feed from the supply to the chamber at the water pressure, to return the element to its first position, thereby moving the check valve to its seat, the displacement of the element being sufficient in connection with the minuteness of the passageway to permit the return of the element to its first position and the ultimate closing of the valve being delayed long enough to allow the desired amount of water to pass the valve.

My improvements upon these features consist in making the displacing element in the form of a piston so constructed that it will be in self adjusting frictional contact with its engaging cylinder to prevent any leakage of the slowly increasing volume of water in the chamber, which contact may be adjusted to suit the pressure of the water supply at any specific installation, the said frictional contact being in large measure decreased during the displacing movement of the piston to afford an easy and quick displacement, the cause acting to decrease the friction also coöperating with other specially constructed parts, to provide, in part, the outlet for the displaced water.

It is desirable to provide an exit of ample size for the displaced water, in order that there may be a quick displacement in the chamber and opening of the check valve, and that there may be required as little labor by the operator as is feasible. For these reasons I prefer not to rely entirely upon the means affording an exit for the displaced water provided by the piston, which only acts simultaneously with the opening of the check valve, but also to use an auxiliary valve which opens to the chamber before the piston moves to permit a free exit for the displaced water.

My improvements also extend to this valve which is constructed to be self closing by the action of the inrushing water previous to the return movement of the piston, so that there will be no leakage of the water past it during the refilling of the chamber.

Referring to the drawing, in which is embodied a preferred construction of my invention, Figure 1 is a main central sectional view with the exit pipe and handle broken off and a few parts shown in outside view in whole or in part; Fig. 2 is an elevation viewed toward the right in Fig. 1, partly in section and broken away to show the interior; and Fig. 3 is a fragmental sectional view on the line III—III of Fig. 1, with certain parts shown in full.

The valve casing 1 comprises a conduit 2 for the flow of water from the inlet to the outlet, as indicated by the arrows, a cylindrical chamber 3 opening to the conduit, a boss 4 oppositely disposed to the chamber and in alinement therewith, and a valve seat 5 in the conduit and also in alinement with the chamber and boss.

The valve 6 has the usual yielding face on the seating side confined within a peripheral flange, and a threaded stem 7 projected from its opposite side for mounting thereon the piston. This is formed of a ring 8 of yielding material supported between the disks 9 and 10, the former being loosely mounted on the stem against a spring 11 and the latter being screwed thereon and further secured by a lock nut in the usual manner. The faces of the ring are beveled to converge toward the center and engage similar faces on the disks. This enables the disks to expand the ring by the action of the spring, thus making a tight fit thereof within the chamber, and by adjusting the threaded disk upon the stem the tension of the spring may be varied as desired to accommodate the ring to various water pressures. The chamber is closed at the end by a gasketed cap 12, which enables the valve and piston to be easily installed or removed.

The check valve and stem are centrally bored to afford communication between the chamber and water conduit. The bore is threaded at the valve end for receiving a threaded valve seat member 13 for the auxiliary valve 14. The member 13 is conveniently shouldered to overlap the yielding disk of the valve 6 to make a water tight joint. Both the valve seats are directed toward the chamber, in order that the opening of the valves will be by movement in that direction. The valve 14 is faced with yielding material similar to valve 6 and is restricted in its opening movement by a shoulder formed in the retaining bore formed in the valve 6 and stem thereof. The valve 14 is further provided with a stem extending into the water conduit having upon its free end a dished out head 15. This is positioned at a suitable point near the port of the valve 6, so that when the valve parts are moved to open, the head will be directly in the path of the inrushing water, which will strike under the dished face and carry the stem with it to instantly close the valve 14. The chamber is continuously open to the water supply through a small passageway or bleeding hole 16.

The operating means for the valve comprises a plunger 17 slidably engaged in the bore of a cylinder 18 extending into the water conduit through an orifice in the boss and flanged to set upon a shoulder formed in the orifice next to a packing ring for making a water tight joint in the usual manner. The cylinder is held in place by a bored plug 19 screwed into the bore of the boss, which also serves as a stuffing box for the plunger. The free end of the cylinder serves as a valve seat for the valve 20, which is secured on the projecting end of a stem extending from the plunger. A yielding ring 21 is mounted on the stem next the plunger to snugly fit within the cylinder to prevent leakage and to assist in returning the plunger and operating lever. The valve 20 is faced with a yielding disk to make a tight closure in the usual manner, and is positioned in direct alinement with the head 15 to coact therewith, when moved to it, to serve as an opening means for the check valves and piston.

The boss is threaded at the base and has a slitted and tapered end within which is a shouldered socket for receiving the head 22. A nut 23 is screwed on the boss, and has a tapered bore to enable it when advanced to contract the corresponding tapered parts of the boss in order to tightly embrace the head but permitting of its easy adjustment within the socket when the nut is retracted. The head has an extension on one side at right angles to its axis, provided with similar internally threaded ends for receiving a pair of bearings 24, 25. In these is journaled the right-angularly bent end of the operating handle 26. The end passes entirely through the bearing 24 and its removal is prevented by the split ring 27 sprung into a groove in the end adjacent the bearing. Adjacent the ring the end is formed square for receiving the operating arm 28, and is then rounded again for engagement by the bearing 25. By this construction the bearings are easily interchangeable to reverse the position of the handle. The arm extends into the head above the plunger, and a screw plug 29 is used to close the head at this end, which is reduced and extended into the head to afford a stop for the arm in its upward movement and for keeping the handle in a horizontal position.

The operation is as follows: The handle is swung away from the casing until the plunger is moved its entire stroke, to open the check valve. It is then released, whereupon the impact and pressure of the inrushing water operate on the valve 20 and plunger 17 to instantly return them to the first position, and also the handle, if it is not arranged to be returnable by gravity.

On the advance stroke of the plunger, it immediately strikes the head 15 and forces the auxiliary check valve 14 open. The chamber is thus opened before the check valve 6 is moved, in order to insure slight resistance to its movement and to afford a ready exit for the water displaced from the chamber. The auxiliary valve has but slight movement due to the stop shoulder in the valve 6. A further movement of the plunger starts the movement of the check valve from its seat to open the conduit to the water supply. The ring 8, on account of its inertia, its frictional contact against the walls of the chamber, and its yielding driving connection from the check valve on the advance stroke due to the spring 11, does not respond to the initial motion of the check valve as quickly as the disk 10, which is rigidly connected to the valve, that is to say, it lags behind a little to permit the two to slightly separate, which allows the water in the chamber to pass the loosely fitting disk 9. This permits an additional exit for the displaced water. The ring, then being free from the disk 10, slightly contracts to loosen its hold on the walls of the chamber and then travels with the disk for the remainder of the stroke, and finally readjusts itself in contact with the disk at the end of the stroke. As soon as the plunger returns, the head 15 is carried along with the rushing water to close the valve 14. The chamber then begins to be refilled from the water supply through the bleeding hole, which slowly returns the piston and the check valve 6 to closed position, the desired amount of water having in the meantime passed through. It will be noted that on the return stroke the disk 10 does the driving of the ring 8 instead of the yielding disk 9. The ring and disk, therefore, form a tight joint at the start and the ring immediately expands to closely embrace the chamber, thus making a tight joint and preventing any leakage from the slowly filling chamber. The bleeding hole is ordinarily provided with an adjustable needle valve, but I have not shown it, as it forms no part of this invention.

My invention is shown in connection with flush valves for toilets, but it is obvious it can as well be used in sink valves, or wherever self closing and time valves are required.

Having described my invention, I claim:

1. In a self closing valve construction, a valve, a stem extending from the valve, a valve closing disk, rigidly secured on the stem, a second disk loosely mounted on the stem between the first disk and valve, forming with the first disk a flaring groove, an expandable packing ring fitted within the groove to be expanded by the rigidly secured disk on the closing stroke, and a spring forming a yielding drive from the stem for the loosely mounted disk on the opening stroke to permit the said disk and ring to lag behind to open the joint between the ring and rigidly secured disk to afford communication between the opposite sides of the disk through said opened joint and loose mountings of said second disk and to permit said ring to contract on the opening stroke.

2. In a self closing valve construction, the combination with a valve, of a liquid filled chamber, a valve closing piston operatively connected to said valve and reciprocable in said chamber, means providing an escape for the liquid when said piston is forced into the same, said piston including a yielding disk and a relatively fixed disk forming a flaring peripheral groove, with the yielding disk and a packing ring fitting said groove and forced by the disk into engagement with the inner walls of said chamber, said ring contractible to permit liquid to flow about said ring from the chamber when the flow of liquid through said escape is restricted.

3. In a self closing valve construction, the combination with a valve, of a valve closing piston operatively connected to said valve, a liquid filled chamber, means providing an escape for the liquid when said piston is forced into the chamber, said piston including a pair of disks movable relatively to each other with one of the disks constituting a fixed part of the piston and the movable disk disposed between the valve and the fixed disk, a packing ring disposed between said disks and normally engaging the wall of said chamber, the disk on the side of the ring facing the chamber spaced from the wall thereof and movable away from said ring when the piston is forced into the chamber permitting liquid to escape from the same about said disk and a spring acting on said movable disk and tending to resist the escape of water about the ring.

4. In a self closing valve construction, the combination with a valve, of a liquid filled chamber, a valve closing piston operatively connected to said valve and reciprocable in said chamber, said piston including a packing ring normally spaced from or in loose engagement with the wall of the chamber and contractible from a position in tight frictional engagement with the walls of said chamber when said piston is moving into said chamber whereby the liquid in the chamber may pass therefrom about said ring and means normally acting on said ring to expand the same bodily into tight frictional engagement with the wall of the chamber.

5. A self closing valve construction comprising a casing having a water filled chamber, a piston for displacing the water from said chamber, said piston having an outlet for permitting the escape of the displaced water, said piston comprising two superposed disks, spaced from the inside of the chamber and movable relatively to each other, and an inwardly beveled packing ring positioned between said disks and normally in light frictional engagement with the inside of said chamber, a valve fixed to the disk which is facing the chamber and adapted thereby to be moved into closing position by the water pressure in the chamber and a comparatively minute passageway leading to said chamber adapted to slowly feed pressure water thereto, thereby to act on said facing disk and return said valve to its closing position and means tending to hold said other disk stationary whereby the said facing disk will force the packing ring into tight frictional engagement with the inside of the chamber.

6. In a self closing valve construction, the combination with a fluid controlling valve, means for seating said valve including a water filled chamber, and a piston reciprocable therein, said piston including a stem fixed to the valve, a disk adjustably mounted on the stem and having an outwardly beveled face, a second disk slidably mounted on the stem and having a beveled face coacting with the beveled face on the relatively fixed disk to form a flaring peripheral groove, a packing ring fitted within the groove and extending beyond the outer edges of the disks, and a spring acting on said slidably mounted disk to cause said disk to approach and expand the ring into a tight frictional engagement with the wall of the chamber.

In testimony whereof I have hereunto set my hand in the presence of two witnesses.

EDWARD G. HEDGES.

Witnesses:
SAMUEL C. C. YEATON,
OLIVE B. KING.

Copies of this patent may be obtained for five cents each, by addressing the "Commissioner of Patents, Washington, D. C."